United States Patent [19]

Cantor

[11] 4,198,164
[45] Apr. 15, 1980

[54] PROXIMITY SENSOR AND METHOD AND APPARATUS FOR CONTINUOUSLY MEASURING RAIL GAUGE

[75] Inventor: Clarence Cantor, Alexandria, Va.

[73] Assignee: Ensco, Inc., Springfield, Va.

[21] Appl. No.: 787,308

[22] Filed: Apr. 13, 1977

Related U.S. Application Data

[63] Continuation-in-part of Ser. No. 730,322, Oct. 7, 1976, abandoned.

[51] Int. Cl.$^2$ .............................................. G01B 11/14
[52] U.S. Cl. .................................... 356/375; 250/202
[58] Field of Search ....................... 250/553, 202, 203; 328/111; 356/167, 375

[56] References Cited

U.S. PATENT DOCUMENTS

| 4,077,723 | 3/1978 | Pirlet | 356/167 |
| 4,114,034 | 9/1978 | Hunka | 250/202 |

FOREIGN PATENT DOCUMENTS 1369846  10/1974  United Kingdom ..................... 356/169

OTHER PUBLICATIONS

Michael, Wayne, "All-Weather Gage Measuring Systems". D.O.T. Report No. DOT-FR-74-09, Mar. 1974.

*Primary Examiner*—John K. Corbin
*Assistant Examiner*—R. A. Rosenberger
*Attorney, Agent, or Firm*—Sixbey, Friedman & Leedom

[57] ABSTRACT

A method and apparatus for railroad track surveying for accurately determining track gauge includes a pair of electro-optical sensors which are situated completely above the rail head level. A collimated light source in each sensor projects a narrow light pattern containing a substantial vertical component downwardly against the gauge surface of the rail. An optical system in the sensor collects an image of the pattern and focuses it upwardly along an object axis to a focal plane. A detector in said focal plane is responsive only to that portion of the image which appears at a juncture of the focal plane with an object plane which includes said object axis and extends laterally thereof in directions parallel to the plane of the rail heads and intersects the gauge surface at a point five-eighths of an inch below the running surface when the rail head is at its nominal position. This geometry insures that the sensor measures gauge in a plane that is five-eighths of an inch below the plane containing the running surface of the rail heads, which represents effective gauge as defined by the DOT/FRA track standards. The sensor output signals are processed to provide high-speed continuous measurement capability.

The system would find broader application wherever accurate position sensing is required from without the plane of deviation of the measured object.

8 Claims, 8 Drawing Figures

(A) THRESHOLD VIDEO
(B) DATA
(C) CLOCK
(D) ENABLE

PROXIMITY SENSOR AND METHOD AND APPARATUS FOR CONTINUOUSLY MEASURING RAIL GAUGE

RELATED MATERIALS

This invention was developed under U.S. Department of Transportation Research Program Contract No. DOT-FR-20032.

This application is a continuation-in-part of my earlier application Ser. No. 730,322, filed Oct. 7, 1976, now abandoned.

FIELD OF INVENTION

This invention relates generally to the accurate non-contract sensing of the position of an object which is expected to deviate within a given plane, the sensing mechanism being disposed wholly without that plane. The invention is particularly applicable to measuring the gauge of railroad track from a fast-moving rail vehicle carrying two oppositely disposed non-contact sensors, the track gauge being simply the sum of the left and right sensor measurements and the fixed mounting distance between the sensors.

The Department of Transportation, Federal Railroad Administration track standards define gauge as the distance between the rails as measured in a plane that is five-eighths of an inch below the top of the rail heads. One reason for the adoption of this standard is that wear on the running surface sometimes produces a thin overhanging lip at the juncture of the running surface and the inside, or gauge surface of the rail head. This type of wear is particularly evident on the low rail of a curved (and banked) track, and is of sufficient magnitude to result in seriously erroneous measurements if taken from the upper portions of the rail head.

BACKGROUND OF INVENTION—PRIOR ART

Various non-contact proximity sensors have been developed for use in determining gauge from a fast moving survey vehicle. These sensors include capacitive, magnetic and electro-optical sensors. Exemplary of these devices are those set forth in Wallen U.S. Pat. No. 3,517,307 and in Wilmorth U.S. Pat. No. 3,864,039, each of which are sensitive to structure at the running surface or at its juncture with the gauge surface where errors are introduced by the aforementioned overhanging lip. In order to measure the gauge at the five-eighths inch point, hereinafter referred to as the gauge point, a capacitive or magnetic sensor must be mounted below a plane including the top or running surface of the rail. However, when so located the sensor suffers from poor sensitivity at large air gaps and from distortion of the measurement by rail components that are extraneous to gauge, e.g., the rail web and base. While this problem can be overcome by a servo-driven gauge sensor carriage which maintains a small air gap between sensor and rail head regardless of gauge deviations, the moving parts of the servo present longevity problems in the rugged rail environment. Moreover, such sensors are vulnerable to damage in areas where certain track structures or ancillary structures protrude into the area between the rail heads, e.g., at grade crossings, rail crossings, switches, and guard rails, and have required provisions for elevating the sensors while the survey vehicle traverses such structures. These provisions in turn require the services of an alert operator or possibly an additional sensor and control system, and are incapable of maintaining measurement during passage over such objects.

In the field of non-contact position sensing generally, numerous electro-optical systems have been developed which employ a projector for illuminating a point on a sensed surface and an optical system for observing the illuminated point. Deviations in the distance between the sensor and the illuminated point cause movement of the observed image which is detected by an appropriate photosensitive detector. Examples of such systems are found in Mansfield U.S. Pat. No. 3,821,558; Svetlichny U.S. Pat. No. 3,633,010; Hosterman U.S. Pat. Nos. 3,589,815; Bailey 3,016,464; and Gunther et al U.S. Pat. No. 3,137,756. The sensing in each of the foregoing patent disclosures takes place in a single plane defined by the projection and the sensing optical paths, and the sensed positional deviations take place within this same plane. Hence, if such an electro-optical system were employed in sensing the gauge point of railroad rails, it too would have to be placed below the plane defined by the running surfaces of the two rails. In this position, it is subject to the aforementioned interference from structural obstructions.

An electro-optical measurement system disposed wholly above the plane of the rail surfaces is disclosed in the aforementioned Wilmarth U.S. Pat. No. 3,864,039. This patent discloses a system which relies on the position of a shadow boundary as representative of the position of the inner surface of the rail head, and does not represent effective gauge as defined by the aforementioned DOT/FRA standard.

Finally, an electro-optical measurement system disposed above some points of measurement is disclosed in Bess U.S. Pat. No. 3,393,600, but this system does not confine its point of measurement to a single plane.

OBJECTS OF INVENTION

In contradistinction to the aforedescribed prior art, it is among the objects of this invention to provide a non-contact sensor and a method for determining the precise position of a point on an object, which position is subject to deviation within a given plane, in which 1. the sensing mechanism is located outside of the plane of deviation of the measurement point,
2. the sensor is particularly adaptable to rail gauge measurement from a moving survey vehicle,
3. the sensor is capable of measuring gauge through switches, crossings, guard rails, etc.,
4. the sensor tolerates an adverse vibrational environment by virtue of its freedom of any moving parts,
5. the sensor measures gauge at a precise gauge point below the running surface of the rail head and ignores deviations at other points, such as excessive wear or wear induced lips at the top edge of a rail, and
6. sensor measurements are logically processed to provide direct readout of the interpolated mid-point of the gauge measurement.

DESCRIPTION OF DRAWINGS

The foregoing, and other self-evident advantages will be best understood by a consideration of the ensuing specification and the drawings, in which

FIG. 6 is a plot indicating the relationship of sensor output count to gauge variation.

DESCRIPTION OF INVENTION

Figure 1:
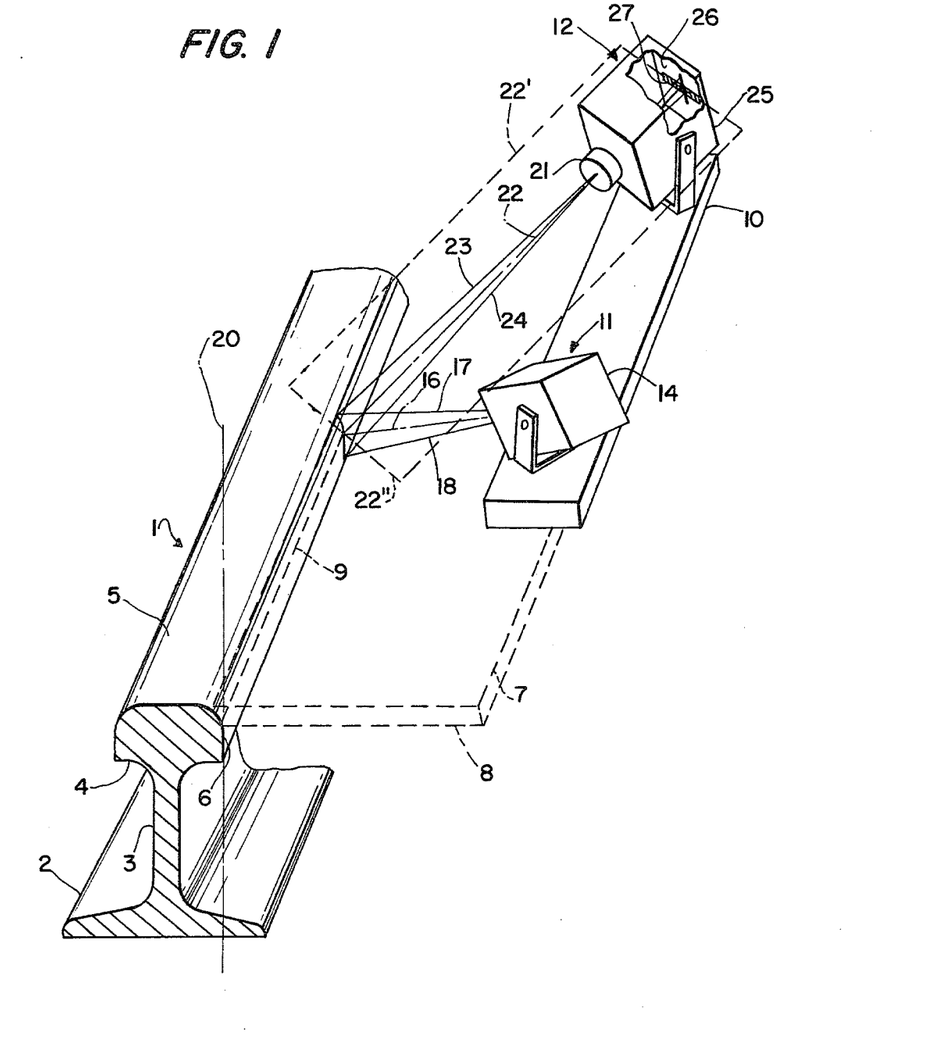
FIG. 1 is a pictorial schematic of a sensor and section of rail undergoing measurement.

Referring to FIG. 1, a section of conventional rail generally indicated at 1 comprises a base 2, a web 3, and rail head 4 including a running surface 5. The rail depicted is the left hand rail of the particular track section, hence the approximately vertical surface 6 on the right hand side of the rail head 4 is opposed to that of the companion rail and is termed the gauge surface. The juncture of the running surface 5 and gauge surface 6 is subject to physical alteration as a result of wear and thus is an unreliable point for effective gauge measurement. Neither does the bottom of the gauge surface 6 represent a reliable point for effective gauge measurement. Consequently, the Department of Transportation through its Federal Railroad Administration has established a point on the gauge surface 6 which is ⅝ inch below the running surface 5 as a standard point for measuring track gauge. Thus two planes become significant as a preliminary to a discussion of this invention. First is a plane including the running surfaces 5 of each rail of a given track section and illustrated in the drawings at 7. Secondly, a plane spaced parallel to running surface plane 7 and situated ⅝ inch therebelow is illustrated at 8 and is termed the gauge plane or, in applications other than rail gauge measurement could be termed the plane of measured deviation. This plane of course, intersects the rail head at the standard gauge point, a succession of which points define a gauge line 9 extending the length of the rail head.

Figure 3A:
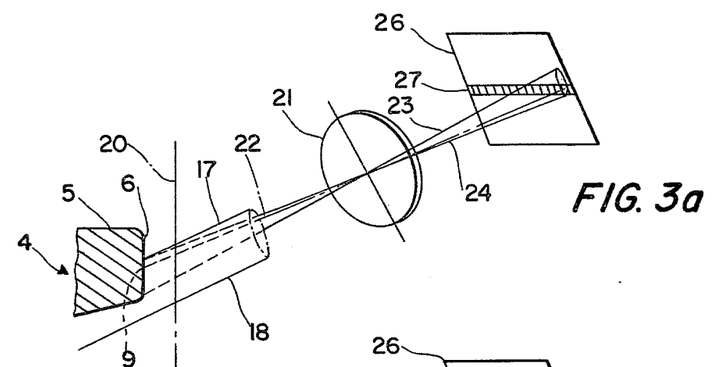
FIGS. 3a, 3b, and 3c are diagramatic elevational views of the sensor geometry taken on line III—III of FIG. 2 and showing the rail in various positions.
Figure 3B:
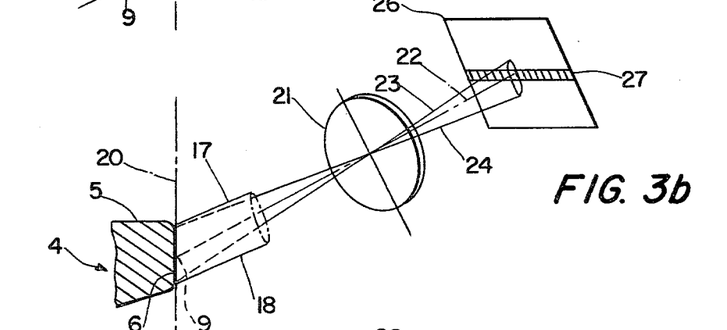

To the end that the electro-optical sensor of this invention may be disposed wholly above the running surface plane 7, there is provided a carrier 10 which, in a preferred embodiment, is disposed three inches or more above the running surface plane 7. The carrier supports an optical projector 11 and an optical sensor 12 spaced a predetermined distance from each other. The spacing is not critical, but once established is maintained constant by virtue of the common mounting on carrier 10. The projector 11 includes a source of collimated energy such as a laser source 13 disposed within housing 14 including means 15 to shape the exiting energy into a beam whose cross-section has a substantial vertical component and small lateral component. In the illustrated embodiment a line-shaped laser light source 13 is focused by lens 15 to produce a narrow vertically oriented beam of light, but it is to be understood that any means for generating a narrow cross-sectional pattern having a substantial detectable vertical geometric component will suffice. For example, a light source and vertical shield which produced a broad light field having a narrow dark vertical component at the center could be substituted without departing from the concept of this invention. The projector is oriented to project the beam, shown diagramatically as centered at 16 and having a vertical component extending between limits 17 and 18, to intersect the gauge surface 6 with its center 16 at the gauge line 9 when the rail is in its expected nominal position as illustrated in FIG. 1 and FIG. 3b. The nominal position is diagramatically indicated by line 20.

The sensing means 12 includes optical elements including lens 21 which establish an object axis 22 disposed partly within a housing 24 which is oriented to situate the object axis so as to intersect the projection axis 16 at the gauge line 9 when the rail is in its nominal position 20. To aid in an understanding of subsequent discussion, it is convenient to envision an object plane 22' which includes object axis 22 and extends laterally thereof in directions parallel to running surface plane 7. Thus, the intersection of the object plane 22' and the gauge plane 8 is a line 22" which will intersect the rail gauge surface 6 at the five-eighths inch gauge point throughout any deviation of position of the rail within the range of measurement of the sensor.

Within housing 25, the optical elements including lens 21 focus the sensed image on a focal plane 26 designated diagramatically as the back of the housing 25. This focal plane 26 is preferably perpendicular to object plane 22' but in any event, the two planes intersect along a juncture which defines the location of that portion of the image pattern which is reflected from the five-eighths inch gauge line 9. Inasmuch as this is the only point of measurement which is significant, excursions of the pattern above (see FIG. 3a) or below (see FIG. 3c) that juncture are to be ignored. To this end, detecting means are provided and made sensitive only to that portion of the image pattern which falls upon the juncture of object plane 22' and focal plane 26. In the preferred embodiment, this detecting means comprises a linear array of light sensitive diodes 27, it being understood that other light sensitive means such as a cathode ray sensor could be utilized.

Figure 2:
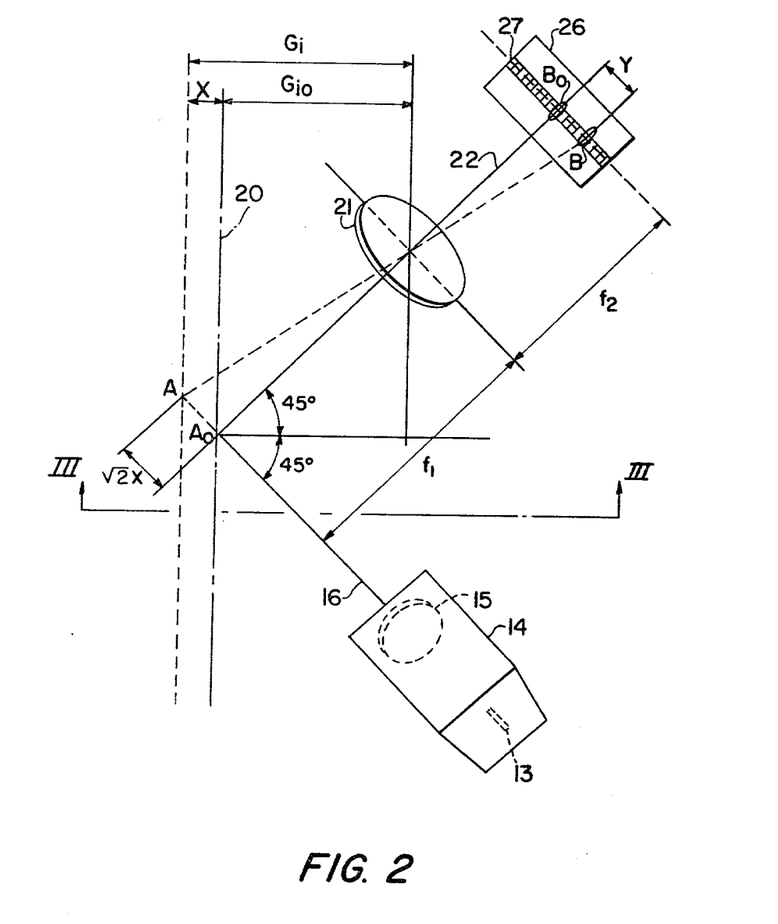
FIG. 2 is a diagramatic plan view of the sensor optical geometry.

Considering the operation of the system, attention is invited to FIG. 2 which is a top view of the sensor geometry relative to the gauge side of the rail head. The slit-shaped beam of light 16 from the light source 13 is vertically oriented and thus forms a vertical line pattern on the gauge surface of the rail head which is itself assumed to be vertical for ease of explanation. This line is imaged by the detector optical system including lens 21 onto the detector focal plane 26, upon which the linear, photo-diode array 27 is disposed along the junction of object plane 22' (FIG. 1) and focal plane 26. The horizontal components of the projection axis 16 and the object axis 22 each intersect the normal to the gauge surface at an angle of 45° in order to maintain linearity of response to positional deviations in either direction.

Let the gauge measurement be denoted $G_i$, where $i=L$ for the left gauge sensor (shown) and $i=R$ for the right gauge sensor (not shown). Then $G_i$ can be expressed as $$G_i = G_{io} + X$$

where $G_{io}$ = horizontal distance between detector lens 21 and nominal position 20 of the rail as measured to the head gauge surface, and $X$ = variation in rail position from nominal When the rail is at the nominal position, the imaged line crosses the center of the diode array 27 (see also FIG. 3b). When the rail position has varied from nominal by distance X, the imaged line crosses the array at a distance Y from center (see also FIGS. 3a and 3b). By simple geometry, $$Y = \sqrt{2SX}$$

where
S = detector optical factor $f_2/f_1$
$f_1$ = detector object distance and
$f_2$ = detector image distance Thus, the sensor gauge variation X is proportional to the off-center distance Y at which the imaged line crosses the diode array 27. Then, the simple identification of which diode is illuminated yields the gauge deviation from nominal, including the sense of that deviation since an opposite variation in X yields an opposite direction for Y.

Figure 3C:
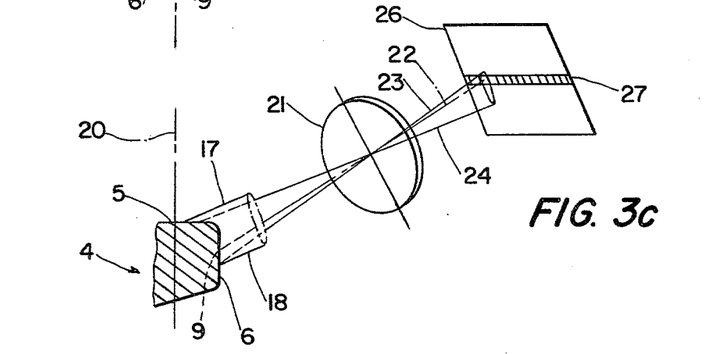

FIGS. 3a, 3b and 3c are side views of the sensor optical geometry taken as indicated by section III—III of FIG. 2. The slit-shaped beam of light 16, 17, 18 from the light source 13 intersects the gauge surface 6 of the rail head 4. When the rail is at the nominal position 20 as seen in FIG. 3b, center 16 of the beam 17, 18 strikes the rail head at the gauge point 9 which is five-eighths of an inch below the running surface 5 of the rail head. The sensor optical axis 22 also intersects the gauge-point 9 when the rail is in the nominal gauge position 20. Thus, the point at which the imaged line crosses the diode array 27 corresponds to the gauge point 9 that is five-eighths of an inch below the running surface 5 of the rail head 4, and is ideally established to be at the center of the diode array 26 when the rail is in the nominal position 20.

Now consider the case in which the position of the rail head deviates to the left as viewed in FIG. 3a. The cross sectional configuration of the slit-shaped beam includes a vertical component sufficient to insure that the beam still intersects the gauge side 6 of the rail head 5 to an extent which includes the five-eighths inch gauge point 9. However, because of the inclination of the projection beam 16, the pattern now falls lower on the gauge surface 6. Indeed, portion 18 of the beam may project under the rail head and be lost beyond the field of view of the sensor. This is of no consequence, however, for since the diode array 27 is arranged along the juncture of the image plane 22' with the focal plane 26, the shift of the image to the right (see FIG. 2) is sensed only at a point B representative of the point at which the pattern crosses the gauge line 9, and excursions of the image as a whole either upwardly (FIG. 3a) or downwardly (FIG. 3c) are ignored. Thus, a complete loss of portions of the beam 16 above or below the rail gauge surface 6 merely results in a shortening of the pattern and resultant image on the focal plane 26 in the areas of the image which are being ignored. It is evident that the same phenomena occurs when rail deviation is to the right as seen in FIG. 3c, which results in a shifting of the image to the left. The inclination of the projection axis 16 and object axis 22 causes a lowering of the image as a whole on the focal plane 26. If part 17 of the projection beam is lost to the pattern by overshooting the upper edge of gauge surface 6, it is in like manner of no consequence, for the pattern is merely shortened in extent in the area below the sensitive range of the diode array 27. The point at which the image crosses the diode array is the only point of relevance, for it and it alone corresponds to gauge measurement in a plane that is five-eighths of an inch below the top of the railheads. This means that even when the side of the rail head is non-vertical, the gauge measurement will be valid, i.e., consistent with the DOT/FRA track standards. A non-vertical side to the rail head causes the illuminated line to be curved instead of straight. However, the image of this curved line still intersects the diode array at a point corresponding to the five-eighths inch point 9.

A geometric proof of the fact that the gauge measurement is always in the five-eighths inch plane is the following. Assuming the track to be level, the slit-shaped beam of light defines a vertical plane 17, 18. The detector optical axis 22 and diode array 27 determine an inclined object plane 22' which intersects the vertical plane in a line. Since the diode array 26 is aligned horizontally and is parallel to the aforementioned vertical plane a line formed by the intersection of the two planes coincides with the line 22" and hence must be in the gauge plane 7, which is assumed to be horizontal for ease of discussion. Stated otherwise, one point in this line 22" is five-eighths of an inch below the top of the rail heads, namely, the intersection of the detector and light source optical axes. Hence, all points in this horizontal line 22" lie in the five-eighths inch plane. This line forms the locus of all possible points of light that can be seen by the diode array. Then any image that falls on the linear diode array must come from an illuminated point on the side of the rail head that is five-eighths of an inch below the top of the rail head.

The foregoing assumes that the height of the sensor assembly relative to the rail head is a constant. With wheel bounce, or with relative motion between the sensor mounting and the truck axle, there would be some variation in this reference height. This would result in occasional gauge measurements in a plane that differs slightly from the five-eighths inch plane. In general, this relative vertical motion would be less than one-eighth inch. The resultant variation of the measurement plane is considered negligible for all practical purposes.

The foregoing principles of operation also assume that there is some diffuse reflection of the beam after it strikes the rail head. If the side of the rail head were a perfect mirror, then the angle of reflection would preclude any reflected light energy entering the detector optical system. Conversely, if the rail head were a perfect absorber of light, there would again be no reflected light energy entering the detector optical system. Fortunately, neither of these extremes occurs in practice. The closest in practice to either extreme is dark, corroded rail which absorbs up to 90% of the incident light energy. A sample of this poor quality rail was utilized to demonstrate the performance of a breadboard sensor, built in accordance with the foregoing principles. This is described next.

The light source was an RCA Type C30091 infrared (GaAs) injection-laser array. The total emitting region of this array was 150×0.08 mils. consisting of 12 individual diode emitting regions each 9×0.08 mils. this array essentially formed a line source which could be simply projected to form an appropriate slit-shaped beam of light. Although the line source consisted of non-contiguous segments, the width of the detector linear array was sufficient to assure detection of the segmented line image. Some defocusing of the projected line occurred with variation in rail position. However, this posed no particular problem since the detector system was designed to measure gauge at a location corresponding to the center line of the projected finite-width line.

The detector system was a Reticon LC 600 line scan camera with a 256-element, linear photo-diode array. The camera had self-contained electronics for periodic scanning of the array to determine which diode(s) were illuminated above a predetermined threshold. This information was made available during each sample period in the form of signals, the relationship of which is evident from a consideration of the waveforms of FIG. 4. As the camera scans the array a diode sensed to be illuminated with a brilliancy producing an output below threshold, as at 30, FIG. 4(a) produces a TTL DATA output of logical zero (low) as seen at 31 in FIG. 4(b). However, when the scan accesses a diode having an output above threshold, as at 32, a logical one (high) is produced at 33 in the data waveform (FIG. 4(b)). DATA will remain high as long as the scan accesses diodes producing an output above threshold, and will return to low 34 only when accessing a diode with output below threshold as at 35. Other TTL outputs from the camera include CLOCK pulses 36 (FIG. 4(c)) and ENABLE output (FIG. 4(d)). The CLOCK pulses 36 are to be utilized for timing the counter and display circuitry yet to be described. The ENABLE output becomes high when the first diode in the array is accessed and becomes low after the last diode is accessed, thus remaining high during a line scan and low during the interval between scans.

Figure 4:
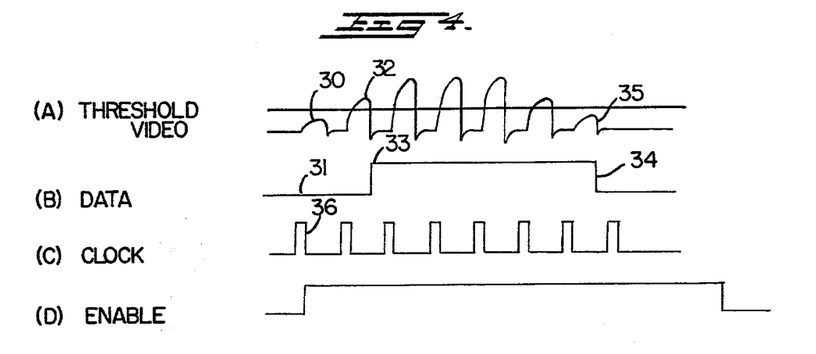
FIG. 4 is a timing diagram of various camera outputs.

Since two or more adjacent diodes may be illuminated simultaneously as indicated by the exemplary waveforms of FIG. 4, depending upon the width of the imaged line B (FIG. 2), it becomes necessary to determine, for display purposes, the identity of the middle diode in a sequence of illuminated diodes. This, then, represents the gauge measurement for that line scan or sample period. To this end, a counter and display unit is provided as schematically represented in FIG. 5.

Figure 5:
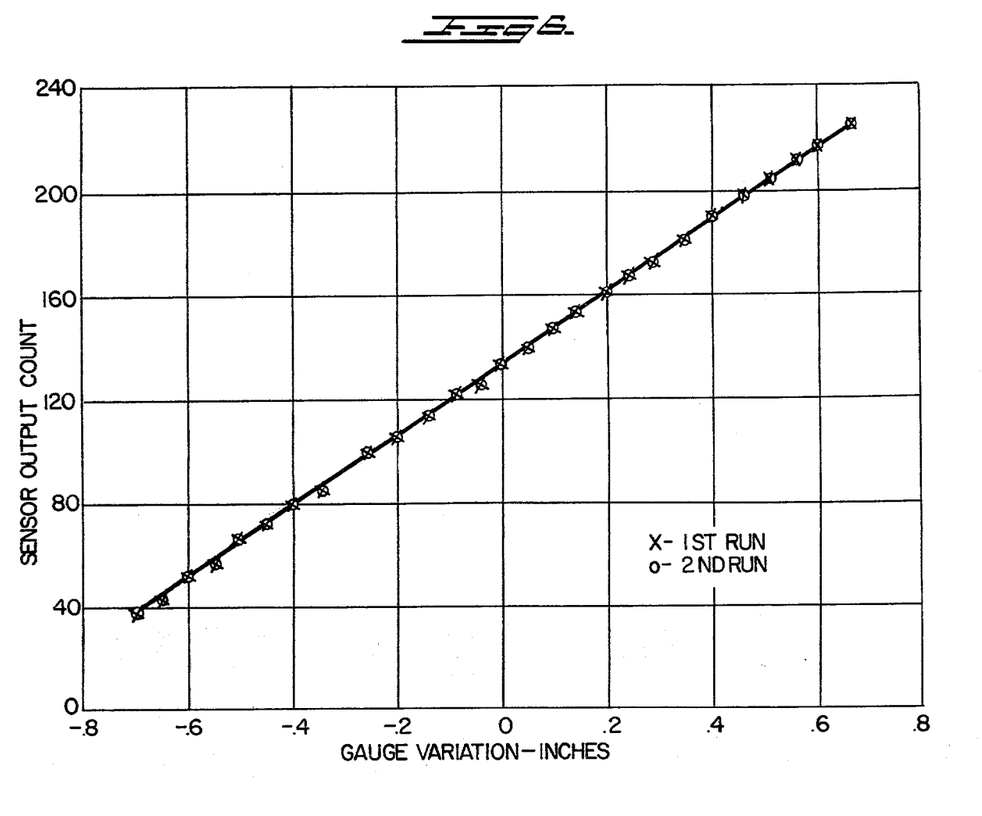
FIG. 5 is a schematic diagram of the counter and display circuits.

Referring to FIG. 5, the counter and display unit comprises conventional seven-segment LED display units 40, 41, 42 and associated decoder/drivers 43, 44, 45. Each decoder/driver in turn is associated with a counter 46, 47, 48 the components 40–48 all functioning in conventional manner to provide a three digit display. The counter and display unit receives three inputs from the line scan camera, namely CLOCK input 50 comprising the waveform of FIG. 4(c); DATA input 51 comprising the waveform of FIG. 4(b); and ENABLE input 52 comprising the waveform of FIG. 4(d).

A description of the operation of the counter and display unit commences at the end of a line scan when a low is present at input 52 which, through NOR gate 55 causes a high on $\overline{\text{ENABLE}}$ line 56 which resets each of the counters 46, 47, 48 to zero and through NOR gates 57 and 58, provides a clock disable at the C.I. input of counter 46. When a new line scan begins, ENABLE line 52 goes high to enable counters 46, 47, 48 to commence counting when clock pulses are provided at the CL inputs of the counters. These clock pulses are provided under two conditions dependent upon the status of DATA input line 51.

Initially, DATA input 51 is low, as seen at 31 (FIG. 4(b)). Therefore, NOR gate 59 is enabled, allowing the inverse of clock pulses received at input 50 to appear at its output on line 60. Similarly, a high inverted DATA signal at the output 62 of NOR gate 61 is applied to the reset input R of latch 63 to produce a low Q output at 64. The low level of 64 applied to gate 65 enables the gate to pass inverted clock pulses appearing at its other input 60 which appear as clock pulses at the CL input of counters 46, 47, 48. Counter 46 commences counting the clock pulses, while counters 47 and 48 remain initially disabled due to the normally high level of the C.O. outputs of counters 46 and 47, respectively. Each time counter 46 reaches its maximum count of 9, its C.O. output goes low so that the next clock pulse increments counter 47 as counter 46 goes to zero. Similarly, counter 48 is incremented as counter 47 passes its maximum count of 9. Thus, the count on counter 46 represents "units", counter 47 represents "tens", and counter 48 represents "hundreds".

When a photodiode of array 27 is accessed which is illuminated above the threshold level, the DATA line 51 goes high. DATA line 51 will remain high for one or more clock pulses depending on the number of photodiodes that have been illuminated, i.e., on the width of the imaged line. A high on DATA line 51 disables gate 59 so that inverse clock pulses no longer appear at its output 60. However, gate 66 is now enabled, thus allowing inverse clock pulses to appear at the C.L. input of latch 63. Latch 63 is connected as a "factor of 2" divider so that the output pulses appear at Q at one-half the clock rate. Since gate 65 has been enabled by the disabling of gate 59, the one-half clock rate pulses are passed to the C.L. inputs of the counters 46, 47, 48. Thus the counters continue counting, but at one-half their former rate. At the end of a sequence of illuminated diodes, the DATA line 51 goes low as seen at 34, FIG. 4(b). This provides a high to the C.L. input of latch 67. The resulting output at Q on line 64 results in a clock disable at the C.I. input of counter 46. Thus the counters stop counting at a count that represents the number of clock pulses from the beginning of a line scan to the middle of the DATA pulse 33. This number then represents the middle diode in a sequence of illuminated diodes, which is representative of the desired gauge measurement for that line scan. At the same time, the latch enable (LE) inputs of the BCD-to-seven segment decoders 43, 44, 45 are energized to display the gauge measurement number on the LED's. The display remains on for the period between the time 34 the DATA line 51 goes low and the time the ENABLE line goes low at the end of a line scan.

During a line scan as indicated by the waveform of FIG. 4(b), there will normally be only one DATA pulse, the center of which represents the gauge measurement. However to minimize the errors resulting from any extraneous illumination of the photodiodes, the circuit is designed to respond to only the first DATA pulse in a line scan. Thus any extraneous DATA pulse occurring after the first one would be inhibited from producing any further count, since the ENABLE line 52 has to go low to reset latch 67 and enable gate 57 for the next sequence of operations.

One sampling period encompasses 264 clock counts. This accomodates the 256-element array and provides the 8 pulses required by the camera circuitry after the access of the last diode in the array and before the start of the next line scan. The camera clock frequency is adjusted to about 26 kHz. This then provides a gauge measurement sample rate of about 100 Hz, which is ample in a rail survey vehicle application. The laser light source is pulsed at a frequency of about 1.5 kHz. Thus the appropriate camera photodiode(s) receives about 15 light pulses in each sampling period. The pulse power supply for the injection-laser array may be constructed as per standard circuitry shown in RCA Application Note AN-4469.

The laser and detector (camera) subsystems were mounted on a rigid platform to form the breadboard sensor. This platform was rigidly suspended from the stationary spindle of a milling machine. The rail sample was mounted to the movable bed of the machine. This permitted precise calibrated motion of the rail with respect to the stationary sensor. This arrangement simulated that shown in FIG. 1. The projections of the detector and laser optical axes in a vertical plane perpendicular to the rail, formed angles of about 50 degrees with the horizontal. The bottom of the platform was about 3 inches above the top of the rail head, which simulated the desired condition for application on a moving rail vehicle. A phosphor screen, infrared detector (GE #3-3361) was used for initial alignment and focusing of the infrared laser line source.

The optical magnifications of the detector and laser subsystems were such as to permit a gauge measurement range of about 1.4 inches. Measurements over this range were performed twice in the same direction, which eliminated any calibration errors associated with mechanical backlash. As expected, the sensor output was linear with gauge variation and very repeatable as shown in FIG. 6.

Despite the unfavorable light emitting and detecting angles, and the poor reflection from the dark rail, there was sufficient signal-to-noise in the detected output to provide an unambiguous measurement at each gauge position except one. This position for which there were no sensor readings falls in a range that was covered by a projected line segment from a low emission diode in a laser array.

No problem was experienced with ambient light in the dimly lit room in which the tests were conducted. In application on a rail survey vehicle, a narrow band optical filter for the detector would be required to eliminate the effect of day light reflected from the rails.

In compliance with the requirements of 35 U.S.C. 112, this invention has been set forth in a description of its preferred embodiment in a surface track rail gauge measurement system. It is readily apparent that the invention has equal applicability in other fields where deviations of an object which occur in one plane are to be determined by a sensor located wholly without the plane. Hence, while deviations in gauge of a surface railroad track occur in a substantially horizontal plane and much of the descriptive matter relates the orientation of the system accordingly, these descriptions and language in the ensuing claims are intended to apply to their corresponding counterparts when measurements are taken in another plane, e.g., an elevator guide rail position sensor.

I claim:

1. In a rail survey vehicle, an electro-optical measurement system for accurately determining track gauge as established by the distance between directly opposite points on the gauge surfaces of the railheads of the respective rails, a succession of said points on each said railhead defining a gauge line positioned a predetermined distance below the running surface of the rail, said system comprising components disposed wholly above said running surface and comprising
A. means for establishing a light pattern on said gauge surface of each rail, each such light pattern establishing means including
  (a) a vertical line array of infrared injection lasers and
  (b) light projecting means to project a vertical line of light derived from said array along a projection axis inclined downwardly from said array to a point of intersection with the gauge of the railhead to establish thereon said pattern whereat said vertical line of light extends above and below said gauge line when said rail is within the expected range of deviation of the lateral position of said rail, and
B. means for sensing said light patterns, each said light pattern sensing means including an optical system having an object axis inclined downwardly and intersecting the axis of said light projection means at said gauge line when said rail is at its expected nominal position, said optical system including
  (a) means for focusing an image of said pattern on an image plane which intersects said object axis whereby deviation in the lateral position of said gauge surface will cause both vertical and horizontal deviations of said image, and
  (b) a multi-element linear photodiode array ignorant of vertical deviations of the position of the image of said light pattern but sensitive to the horizontal position of said image, said linear photodiode array being horizontally disposed in said image plane at a level intersecting said object axis;
C. means for periodically scanning said linear photodiode array and to generate a data pulse upon passing at least one diode which is illuminated by said focused image, the data pulse being retained throughout the period of scan of a sequence of consecutive illuminated diodes, said scanning means including a line scan camera which produces a train of binary pulses and
D. converting means to receive and convert the binary pulse train from said scanning means to a digital display, said converting means including logic means to interpolate the middle diode in a sequence of illuminated diodes of said photodiode array and to pass the interpolated result identifying said middle diode to the display, the logic means including
  (a) means for generating a series of clock pulses each representative of the time of accession of each diode in said array by said line scan camera,
  (b) means for dividing said series of clock pulses by-two only when said data pulse is present, and
  (c) means for counting said divided by-two clock pulses to attain said interpolated result.

2. The electro-optical measurement system of claim 1 wherein said scanning and indicating means provides an enable signal to said converting means for the duration of a scan by said scanning means of said linear photodiode array to initiate operation of said converting means during each such scan, said logic means including latch means responsive to said data pulse and enable signal to cause operation of said converting means in response to only one data pulse during each scan, said latch means operating to prevent operation of said converting means in response to the occurrence of subsequent data pulses during a scan.

3. An electro-optical measurement system as set forth in claim 2 wherein said projection axis and said object axis are each inclined at an angle of substantially 50 degrees from the horizontal.

4. The electro-optical measurement system as set forth in claim 3 wherein said laser array has an emitting region of substantially 150×0.08 mil.

5. The electro-optical measurement system as set forth in claim 2 wherein said linear photodiode array comprises substantially 256 elements.

6. The electro-optical measurement system as set forth in claim 2 wherein said line scan camera is operated at a scan rate of substantially 100 Hz.

7. An electro-optical measurement system for accurately determining railway track gauge as established by the distance between directly opposite points on the gauge surfaces of the railheads of the respective rails, a succession of said points on each said railhead defining a gauge line positioned a predetermined distance below the running surface of a rail, said measurement system comprising light projecting means to project a substantially vertical line of light along a projection axis and onto a railhead to form a line of light on the railhead which extends above and below said gauge line, optical means having an object axis intersecting the projection axis of said light projection means at said gauge line when said rail is at its expected nominal position, said optical means including imaging means for focusing an image of the line of light on said railhead on an image plane which intersects said object axis whereby deviation in the lateral position of said gauge surface will cause both horizontal and vertical deviations of said focused image, and a multielement light sensitive means horizontally disposed in said image plane to intersect said object axis whereby elements of said multielement light sensitive means are illuminated by said image, said multielement light sensitive means being insensitive to vertical deviations of the position of said image but sensitive to the horizontal position of said image and scanning and indicating means operative scan said multielement light sensitive means, said scanning and indicating means including means to generate and maintain a data signal in response to the scanning of elements in said multielement light sensitive means which are illuminated by said image and clocking means to register clock counts at a first clock rate upon the beginning of said scan in the absence of said data signal and to register clock counts at a second clock rate which is one half said first clock rate during the duration of said data signal, said clocking means operating to discontinue the registration of clock counts upon the termination of said data signal.

8. The electro-optical measurement system of claim 7 wherein said scanning and indicating means includes latch means responsive to said data pulse and effective to inhibit said clocking means throughout the period of a scan of said multielement light sensitive means following the occurrence of said data signal.

\* \* \* \* \*